United States Patent [19]

Little et al.

[11] 4,073,467
[45] Feb. 14, 1978

[54] HIGH PRESSURE PINCH VALVE

[75] Inventors: Robert K. Little, Mount Holly; Edgar Barry Lincoln, Moorestown, both of N.J.

[73] Assignee: RKL Controls, Inc., Hainesport, N.J.

[21] Appl. No.: 692,560

[22] Filed: June 3, 1976

[51] Int. Cl.² .................................................. F16K 7/06
[52] U.S. Cl. ...................................... 251/7; 24/263 B; 251/104
[58] Field of Search ..................................... 251/4–10; 222/529; 24/263 B

[56] References Cited

U.S. PATENT DOCUMENTS

| 2,869,816 | 1/1959 | Olander | 251/6 |
| 3,197,173 | 7/1965 | Taubenheim | 251/6 |
| 3,734,133 | 5/1973 | Little | 251/6 X |

FOREIGN PATENT DOCUMENTS

| 1,200,185 | 6/1959 | France | 251/6 |

Primary Examiner—Martin P. Schwadron
Assistant Examiner—Richard Gerard
Attorney, Agent, or Firm—Howson and Howson

[57] ABSTRACT

A mechanically actuated pinch valve for high pressure use which opens to a full round configuration and which closes to a leak tight locked condition. A novel valve actuating mechanism permits the full closure of the valve even with working pressures in the range of 400 psig by a relatively small rotary closing force acting through a 90° arc. A linkage within the valve housing provides a decreasing pinch bar movement with increased actuator rotation so that the maximum mechanical advantage is achieved at the point of valve closure. The thrust of the line pressure, which may be carried on either side of the valve, is borne by bearings at the ends of the pinch bars which ride in grooves in the housing. The actuator automatically locks in the closed position regardless of the direction of the line pressure.

8 Claims, 7 Drawing Figures

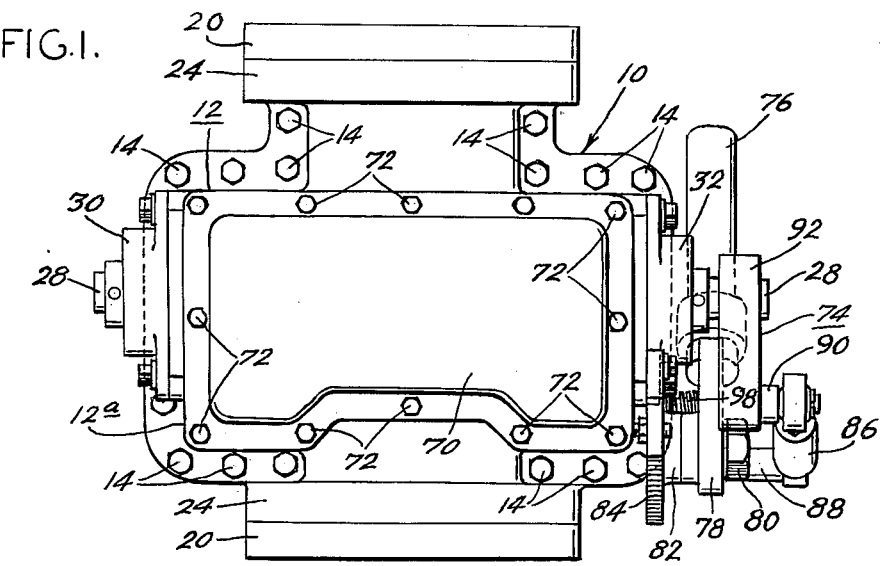
FIG. 1.
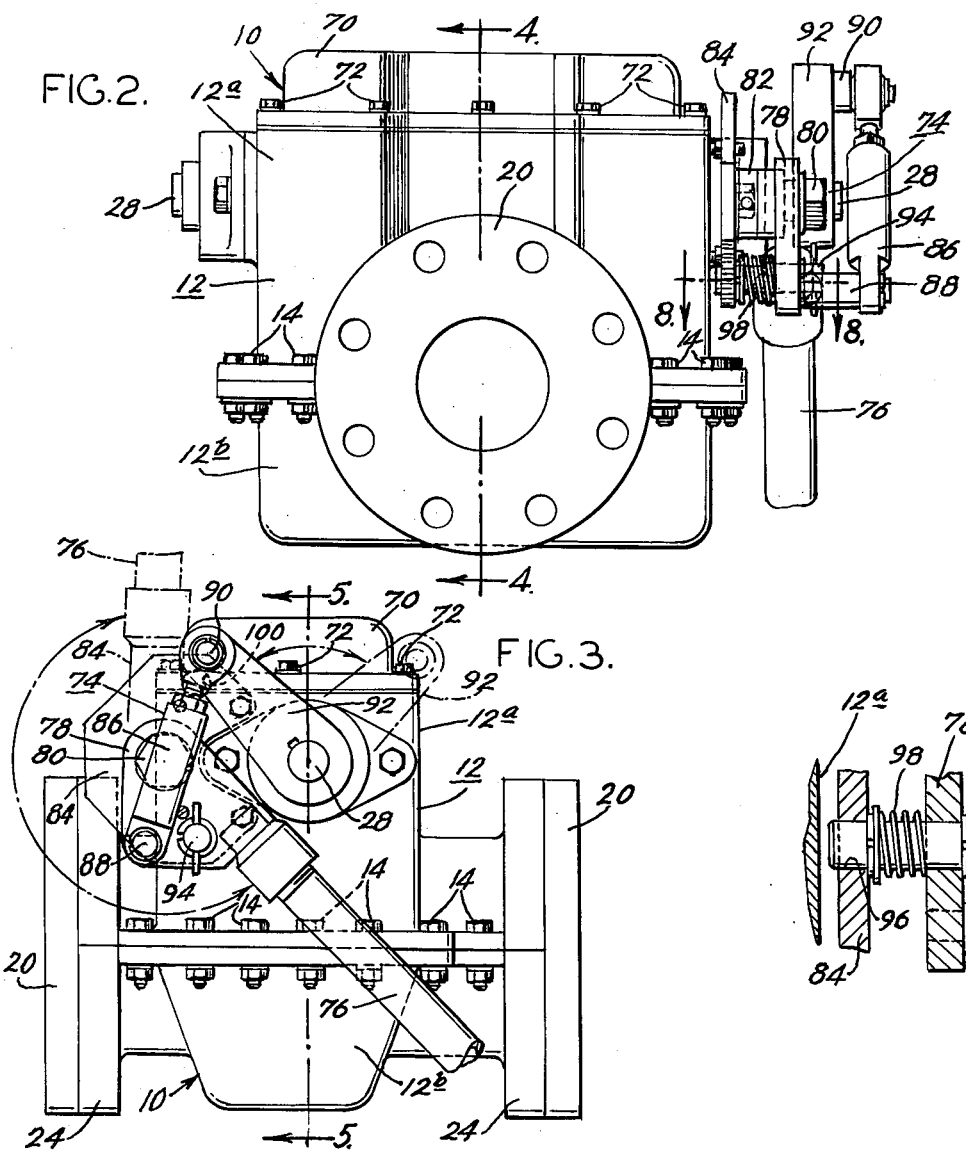
FIG. 2.
FIG. 3.
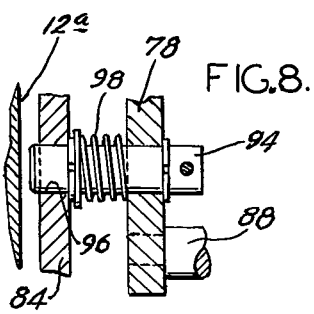
FIG. 8.

HIGH PRESSURE PINCH VALVE

BACKGROUND OF THE INVENTION

The present invention relates generally to valves for controlling the flow of fluids and particulate solid materials and relates more particularly to a pinch type valve of the full round type adapted to close and lock to a leak tight condition even with line pressures in the range of 400 psig.

Pinch type valves have been widely employed to control the flow of such diverse products as dry, abrasive and granular materials and corrosive fluids. The popularity of this type of valve stems from its simplicity, smooth-walled flow path, ability to govern flows of fluid, solid or mixed solid and fluid materials, and adaptability for remote operation. Pinch valves may be built in practically any required size, and require little or no maintenance.

A pinch type valve as the name implies comprises a generally cylindrical hollow elastomeric sleeve known as the valve body, which when pinched between its ends, restricts or stops flow through the body. The pinching of the valve is usually accomplished by mechanical means comprising a pair of opposed pinch bars, one or both of which may be movable.

There are two basic types of pinch valves currently manufactured, the full round opening type wherein the pinched portion of the valve opens to the same cross-sectional size and shape as the ends of the valve body, and the pre-pinched type usually characterized by a fixed pinch bar which holds one side of the valve body in a flattened condition. The pre-pinched type suffers the disadvantage of a constriction in the size of the fluid passage which may become clogged if large objects are to be carried through the valve. The advantages of the pre-pinched type include a simpler actuating mechanism and a shorter actuator stroke with the flow rate more closely corresponding to the displacement of the actuator.

The disadvantages of the conventional full round opening type pinch valve are the long actuator stroke required to close the valve, the complicated actuator mechanism and the inherently non-linear flow characteristics. The first 50% of actuator movement on closure of the conventional valve produces very little change in the flow rate. As a result, most of the valve closure takes place during the past portion of the actuator movement with about 50% of the closure occurring during the last 20% of the actuator movement. Since the closing force required to close a pinch valve increases as the valve approaches the closed position, it can be understood that a conventional valve actuator would require an extremely high actuating force to operate a full round opening type pinch valve under high fluid pressure conditions.

In my U.S. Pat. No. 3,734,133, issued May 22, 1973, a pinch valve actuating mechanism is disclosed which overcomes a number of the problems associated with full opening valves. The actuator of that patent is related to the present invention in that valve closure from full open to full closed is effected by only a 90° rotation of the drive shaft, and the actuator linkage provides an increasing mechanical advantage as the valve approaches the closed position. However, the valve of the patent will only lock against line pressure from one direction, and because of the arcuate movement of one of the pinch bars, cannot be made positive opening from both sides. Furthermore the rolling movement of one of the pinch bars along the valve body produces a considerable frictional resistance which must be overcome by the actuator.

SUMMARY OF THE INVENTION

In the present invention, the full round opening pinch valve body is closed by a pair of opposed parallel pinch bars, the ends of each of which are supported by bearings slidable in slots at each side of the housing. An actuator drive shaft is rotatably disposed within the housing and extends externally thereof for rotation by suitable actuating means through a 90° arc from full open to full closed condition of the valve. A pair of spaced crank elements are attached to the drive shaft for rotation therewith and each includes diametrically opposed crank arms. Connecting links join the crank arms of each crank element to the ends of the pinch bars so that rotation of the drive shaft will move the pinch bars in opposite directions. The drive shaft is parallel to and in the same plane with the pinch bar slots, and the links and crank arms are of such a length that the valve body will be fully closed when the crank arm and link pivot points are aligned with the drive shaft and the pinch bar slots, thereby locking the actuator mechanism against fluid pressure forces from either direction. The non-linear actuator characteristics produces the greatest closing movement at the beginning of the closing cycle and the least movement at the end thereof. The closing forces are therefore greatest during the most difficult part of the closing cycle, thus permitting actuators of relatively small size to close the valve against high pressures. The oppositely moving pinch bars close the valve body on the valve center line and accordingly do not distort the valve body in a fashion which would produce uneven stress concentrations under high pressure closure. Since the pinch bars both move transversely to the axis of the valve body, positive opening means may be provided to provide a positive opening of both sides of the valve body.

It is accordingly a first object of the present invention to provide a full round type pinch valve for high pressure use having a novel valve actuator which provides a closure of the valve from a full open position with only a 90° rotation of the actuator drive shaft.

Another object of the invention is to provide a pinch valve as described wherein the opposed pinch bars both move perpendicularly to the valve body axis and close the valve body on the valve center line, thus permitting the application of positive opening means to both sides of the valve body.

A further object of the invention is to provide a high pressure pinch valve as described which will automatically lock against line pressure from either direction.

Still another object of the invention is to provide a high pressure pinch valve as described wherein the pinch bar closed position is readily adjustable to insure a leak tight closure of the valve.

Still another object of the invention is to provide a high pressure pinch valve as described wherein the greatest mechanical advantage is provided by the actuator toward the end of the closure cycle to permit valve closure against high line pressure using a relatively low actuator force.

A still further object of the invention is to provide a high pressure pinch valve as described of a relatively simple, economically manufactured construction.

BRIEF DESCRIPTION OF THE DRAWINGS

FIG. 1 is a plan view of a pinch valve incorporating the present invention;

FIG. 2 is an end elevational view of the valve of FIG. 1;

FIG. 3 is a side elevational view of the valve of FIG. 1;

FIG. 8 is an enlarged partial sectional view taken along line 8—8 of FIG. 2 showing details of the hand lever locking mechanism.

DESCRIPTION OF THE PREFERRED EMBODIMENT

Figure 4:
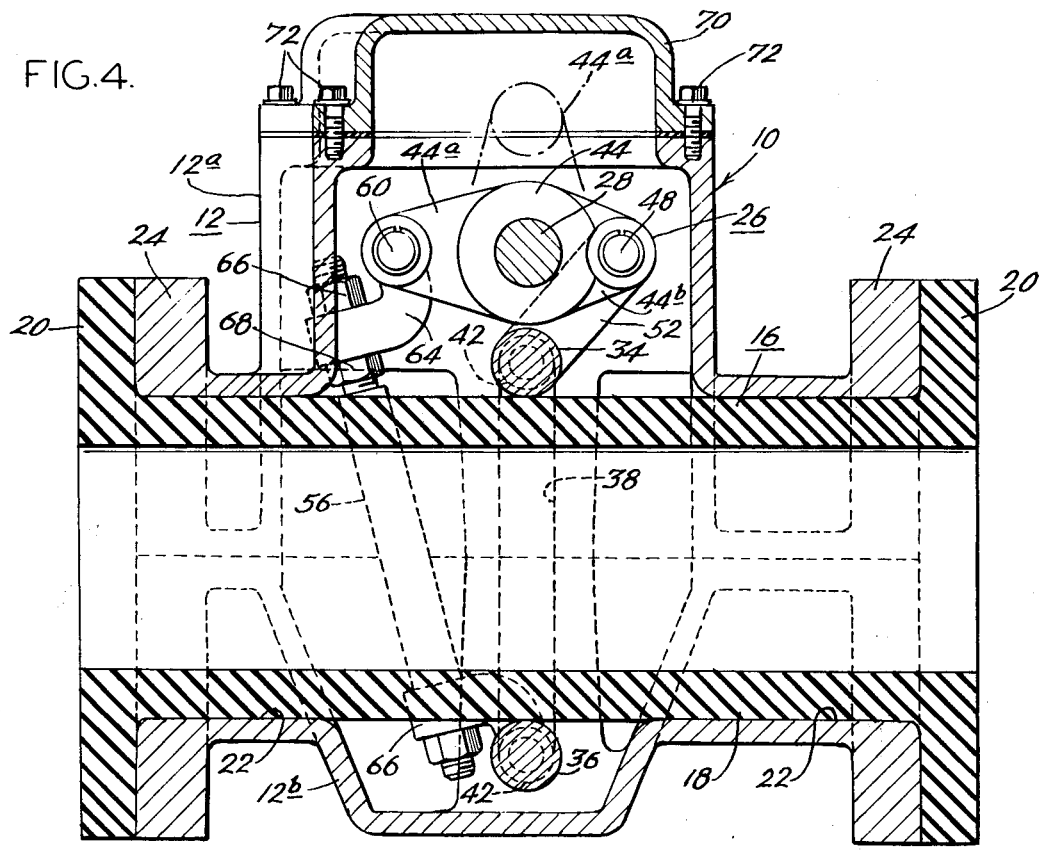
FIG. 4 is an enlarged sectional view taken along line 4—4 of FIG. 2 and showing the valve in the full open position.

Referring to the drawings, a pinch valve generally designated 10 embodying the present invention includes a valve housing 12 comprising an upper housing section 12a and a lower housing section 12b. The housing sections are secured together along opposed horizontal flanges thereof by a plurality of bolts 14. The valve housing 12 is of an irregular shape and is adapted upon assembly as shown in FIG. 4 to internally accommodate a hollow valve body 16 which has a cylindrical tubular portion 18 and circular radially outwardly extending end flanges 20. The valve housing 12 includes a cylindrical supporting surface 22 adjacent each end thereof having an internal diameter equal to the external diameter of the valve body tube portion 18. Valve housing flanges 24 at each end of the valve housing abut and support the valve body flanges 20. The valve housing sections 12a and 12b must be separated by removal of the bolts 14 in order to remove and insert the valve body 16.

Figure 5:
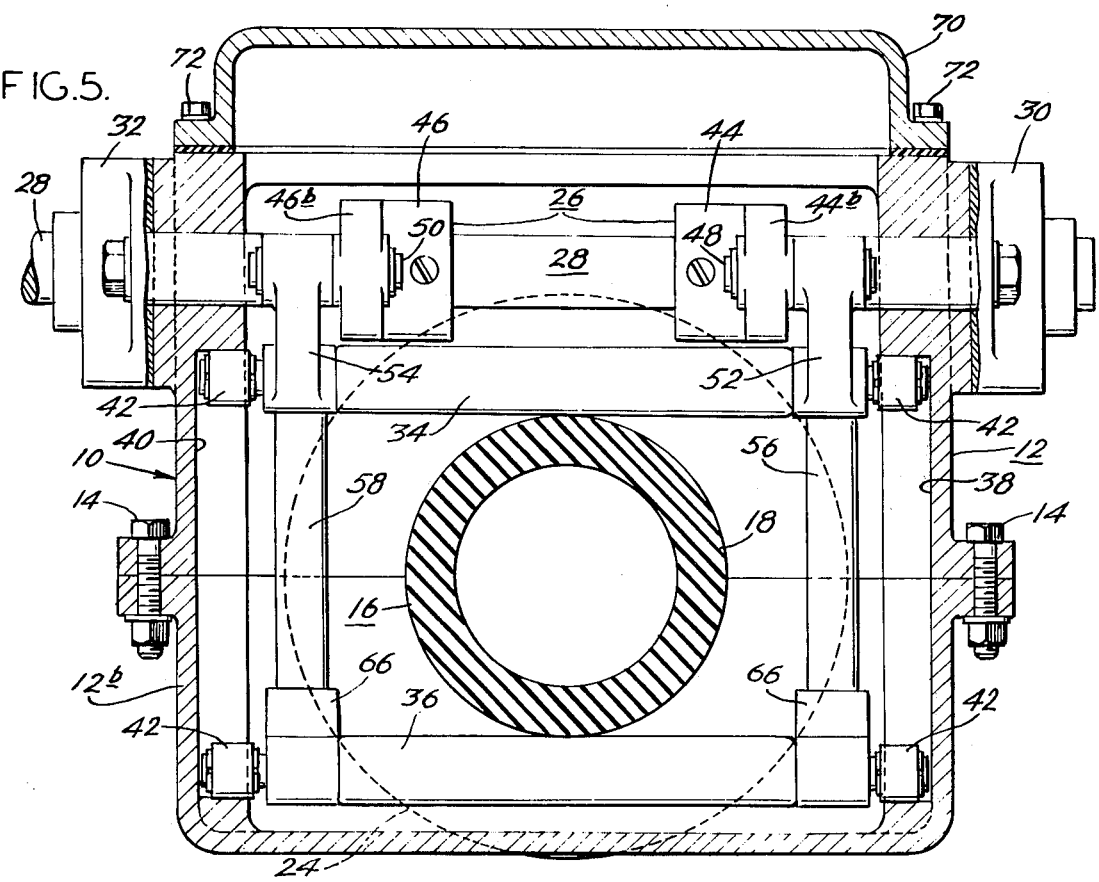
FIG. 5 is an enlarged sectional view taken along line 5—5 of FIG. 3 also showing the valve in the full open position.
Figure 6:
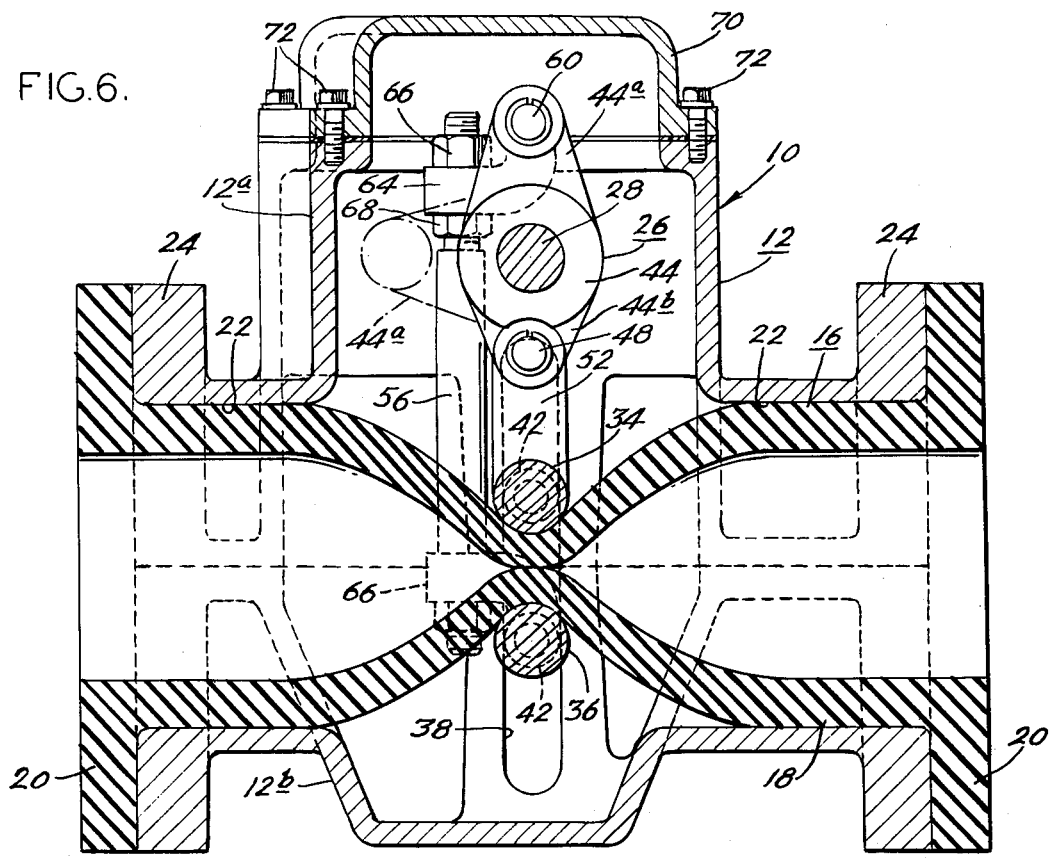
FIG. 6 is a view similar to FIG. 4 but showing the valve in the fully closed position.

A valve actuating mechanism generally designated 26 is disposed within the valve housing between the cylindrical valve body supporting surfaces 22. The actuator mechanism 26 comprises a drive shaft 28 journalled in bearings 30 and 32 at opposite sides of the housing, the drive shaft extending though the bearing 32 for connection to a suitable valve actuating means which in the illustrated embodiment comprises a hand lever assembly as described below. Parallel inner and outer pinch bars 34 and 36 are disposed on opposite sides of the valve body 16 parallel to the drive shaft 28. The ends of the pinch bars 34 and 36 extend into opposed parallel slots 38 and 40 in the side walls of the valve housing 12 and are provided with bearings 42 to allow sliding movement of the bars in the slots with a minimal amount of friction. The drive shaft 28, slots 38 and 40 and the pinch bars 34 and 36 are disposed in the same plane at substantially the midpoint of the axial length of the valve body 16 so as to produce a uniform closing deformation of the valve body as shown in FIG. 6. The slots 38 and 40 are of a length such that with the inner pinch bar 34 and the outer pinch bar 36 against the ends thereof as shown in FIG. 5, the valve body will be fully opened with the pinch bars in non-deforming contact therewith.

The pinch bars 34 and 36 are moved in opposite directions by rotation of the drive shaft 28 through a system of cranks and connecting links. A pair of crank elements 44 and 46 are secured to the drive shaft 28 in axially spaced relation. Crank element 44 includes crank arm 44a and diametrically opposed crank arm 44b. Similarly, crank element 46 includes crank arm 46a and diametrically opposed crank arm 46b. The crank arms 44b and 44b are pivotally connected respectively by pins 48 and 50 to the upper ends of inner pinch bar connecting links 52 and 54. The links 52 and 54 pass on opposite sides of the valve body and the lower ends thereof pivotally receive the reduced diameter ends of the pinch bar 34. Similarly, the crank arms 44a and 46a are pivotally connected to the outer pinch bar connecting links 56 and 58 respectively by pivot pins 60 and 62. As shown most clearly in FIG. 4, the connecting links 56 and 58 includes upper and lower yokes 64 and 66 at the ends thereof to provide clearance for the upper pinch bar and drive shaft when the valve is in the closed position shown in FIGS. 6 and 7. The effective length of the connecting links 56 and 58 may be adjusted by means of the threaded upper ends thereof and the adjustment of the nuts 66 and 68 securing the upper yokes 64 in place. To provide access for this adjustment and also to lubricate and check the general condition of the interior of the valve, a cover plate 70 is provided on the top of the housing and secured thereto by bolts 72 passing through a circumferential flange portion thereof.

As indicated above, the means for rotating the drive shaft comprises a hand lever linkage generally designated 74 which includes a hand lever 76 attached to a plate member 78 which is pivotally attached to the valve housing by bolt 80 passing through one end thereof and into a boss 82 on a locking plate 84 secured to the valve housing. A link 86 is pivotally attached to the plate 78 on a stud 88 and is pivotally attached to its opposite end to a stud 90 on a crank 92 which is keyed at its opposite end to the drive shaft 28. From the broken line illustrations of FIG. 3, it will be seen that a 225° clockwise rotation of the hand lever 76 from its solid line position will produce a 90° rotation of the crank 92 and the drive shaft 28. A considerable mechanical advantage will accordingly be provided by this larger arcuate movement of the hand lever 76.

A locking pin 94 captive in the plate 78 as shown in the enlarged view of FIG. 8 engages a hole 96 in the locking plate 84 and is held in position therein by the spring 98 to maintain the open position of the valve. On withdrawal of the locking pin 94 from the hole 96 the valve may be actuated and closed by movement of the hand lever 76 and the hand lever may be locked in the closed valve position by engagement of the locking pin 94 with another hole 100 (FIG. 3) in the locking plate 84. Intermediate positions of the valve could be established and maintained by the addition of further holes in the locking plate 84.

Figure 7:
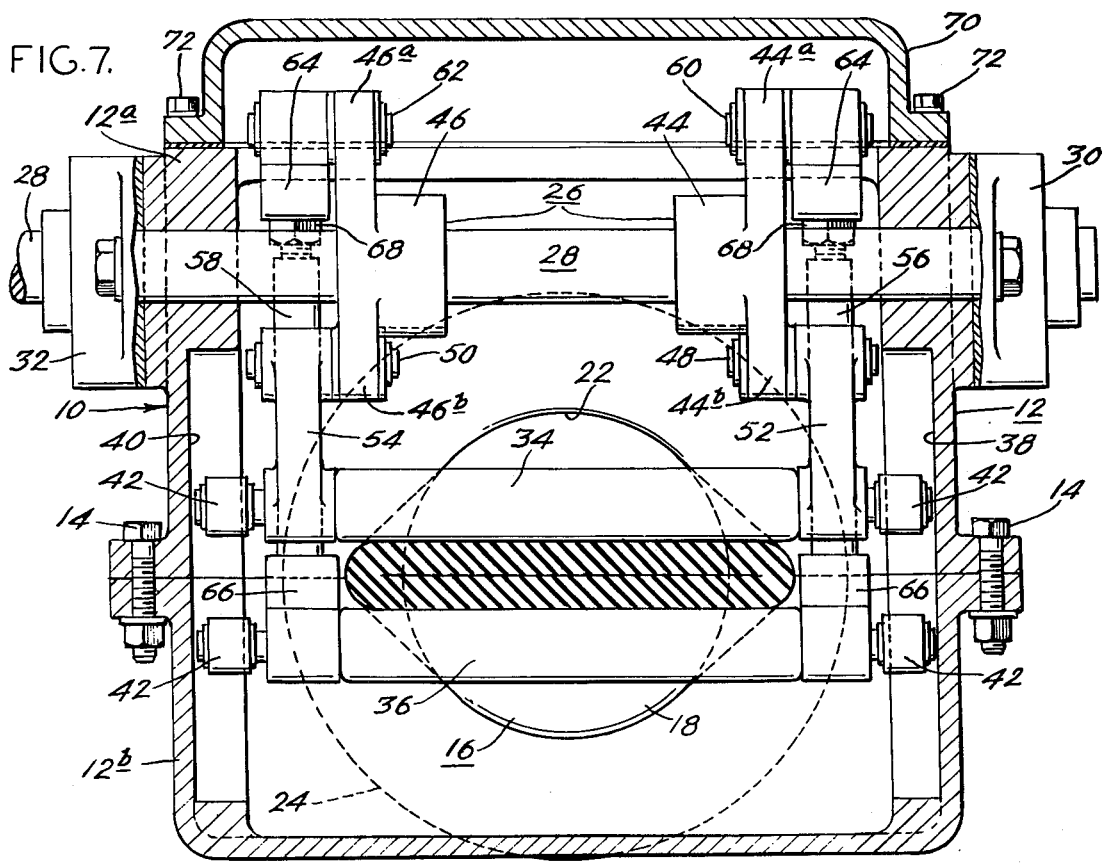
FIG. 7 is a view similar to FIG. 5 but showing the valve in the fully closed position.

The operation of the valve as suggested by the foregoing is effected by the movement of the hand lever 76 from the solid line position shown in FIG. 3 at which the valve is fully opened as shown in FIGS. 4 and 5, to the dotted line (vertical) position of FIG. 3 which causes a 90° rotation of the drive shaft 28 to the closed valve position of FIGS. 6 and 7. The rotation of the drive shaft 28 causes the inner and outer pinch bars 34 and 36 to move toward each other in the slots 38 and 40 as the connecting links 52, 54, 56 and 58 are moved by the rotating crank elements 44 and 46. Since the pinch bars 34 36 move in a plane perpendicular to the axis of the valve body 16, there is no relative movement of the pinch bars with the valve body and hence no rolling friction to be overcome. Furthermore, this arrangement permits the use of positive opening attachments (not shown) to positively open both sides of the pinch valve to insure a full opening of the valve. A preferred form of positive opening device for this purpose is disclosed in my U.S. Pat. No. 3,268,201 issued on Aug. 23, 1966.

When the valve is in the position illustrated in FIGS. 6 and 7 with the crank element pin connections with the connecting links being aligned with the pinch bars, the actuating mechanism will be locked against the opening influence of high pressure fluid in the valve body regardless of which side of the closure the pressure may exist. The valve housing slots which guide the pinch bars prevent pinch bar movement axially of the valve body and the alignment of the connecting links and crank arms with the drive shaft 28 prevent any radial forces exerted on the pinch bars by the pressure within the valve body from tending to rotate the drive shaft in either direction. This automatic locking feature accordingly makes the valve particularly suited for applications in which the line pressure to be varied may change from one side of the valve closure to the other during different phases of operation.

By removal of the cover plate 70 with the valve in the closed position of FIGS. 6 and 7, the valve can be adjusted by means of the nuts 66 and 68 so that the valve body closure is leak tight. This adjustment can be readily made in the field should the valve for any reason such as abrasion of the valve body require adjustment.

It is an inherent characteristic of pinch type valves that the pinching force required to close the valve becomes increasingly larger during the closing cycle until just before the final sealing closure is reached. For this reason, a conventional type of linear valve actuator such as a screw and hand wheel which produces a continuous closing force and rate of closure is not well suited to a full open type pinch valve. The present actuator, however, is ideally suited for such use since the maximum mechanical advantage is developed at the end of the closure cycle. The least mechanical advantage and the greatest rate of movement of the pinch bars takes place at the beginning of the cycle when the resistance is the least. The actuator accordingly may be relatively small with respect to the size of the valve and the high pressures of fluids controlled thereby. Although a hand lever arrangement is shown in the preferred embodiment, it will be obvious that the drive shaft 28 could be driven by a hydraulic or pnuematic actuator, by an electric motor coupled through a worm gear, or by any other suitable means. The short arc of rotation, 90° from full open to full closed makes the valve particularly well suited for control by linear devices such as hydraulic or pneumatic cylinders.

An important feature of the invention is the closure of the valve body on the axial center line of the valve, thereby preventing any distortion of the valve body from a symmetrical configuration which might produce unnecessary stresses and cause valve body failure under the extremely high pressures, in the range of 400 psi, for which the valve has been designed. The lack of relative movement between the pinch bars and the valve body is an important factor in maintaining the uniform configuration of the valve during closure as shown in FIG. 6. The forces on the pinch bars which increases as the valve approaches the closed position, are carried largely by the housing slots, and the bearings 42 further minimize the effort required to close the valve, thus allowing the use as indicated of smaller, less expensive actuating devices.

Manifestly, changes in details of construction can be effected by those skilled in the art without departing from the spirit and the scope of the invention.

We claim:

1. A pinch valve comprising a housing, a substantially cylindrical valve body of elastomeric material disposed within said housing, and a valve actuating mechanism on said housing for controlling flow through said valve body by deforming said body, said actuating mechanism including a drive shaft rotatably mounted in said housing perpendicularly to the axis of said valve body and in spaced relation to said valve body, a pair of parallel pinch bars disposed within said housing on opposite sides of said valve body, means on said valve housing for supporting said pinch bars and permitting movement thereof only in a plane perpendicular to said valve body axis and passing through said drive shaft, a pair of crank elements secured in spaced relation to said drive shaft, connecting links pivotally attached to said crank elements and joined to the ends of said pinch bars to produce opposed movement of said pinch bars in said plane upon rotation of said drive shaft, said crank elements being disposed within said housing interiorly of said connecting links, means for rotating said drive shaft through an arc of substantially 90°, said drive shaft when rotated to a first position with the pivot points of said crank arms and connecting links aligned in the same plane with said pinch bars producing a leak tight closure of said valve body and a locking of said actuating mechanism against movement due to line pressures on either side of the valve closure, the rotation of said drive shaft to a position substantially 90° from said first position producing a fully opened condition of said valve body, and means for adjusting the length of a pair of said connecting links to adjust the spacing of said pinch bars in said first position of said drive shaft.

2. A pinch valve comprising a housing, a substantially cylindrical valve body of elastomeric material disposed within said housing, and a valve actuating mechanism on said housing for controlling flow through said valve body by deforming said body, said actuating mechanism including a drive shaft rotatably mounted in said housing perpendicularly to the axis of said valve body and in spaced relation to said valve body, inner and outer parallel pinch bars disposed within said housing, said valve body passing between said pinch bars for selective deformation thereby, means on said valve housing for supporting said pinch bars against movement axially with respect to said valve body while permitting movement of said pinch bars in a plane perpendicular to said valve body axis and passing through said drive shaft, a pair of crank elements secured in spaced relation to said drive shaft, each of said crank elements including a first crank arm extending radially with respect to said drive shaft and a second crank arm extending radially with respect to said drive shaft diametrically opposed from said first crank arm, an inner pinch bar connecting link connecting said first crank arm to one end of said inner pinch bar, an outer pinch bar connecting link connecting said second crank arm to one end of said outer pinch bar, the connecting links of one of said crank elements being connected to the opposite ends of said pinch bars from those of the other crank element, said crank elements being disposed within said housing interiorly of said connecting links, means for rotating said drive shaft through an arc of substantially 90°, said drive shaft when rotated to a first position with said crank arms aligned in the same plane with said pinch bars producing a leak tight closure of said valve body and a locking of said actuating mechanism against movement due to line pressures on either side of the valve closure, the rotation of said drive shaft to a position substantially 90° from said first position producing a fully opened condition of said valve body, and means for adjusting the length of a pair of said connecting links to adjust the spacing of said pinch bars in said first position of said drive shaft, said housing being split in a plane substantially parallel to said drive shaft to allow removal of said outer pinch bar and replacement of said valve body.

3. The invention as claimed in claim 2 wherein said means on said valve housing for supporting said pinch bars comprises slots in the opposed side walls of said valve housing.

4. The invention as claimed in claim 3 including bearings on the ends of said pinch bars, said bearings traveling within and bearing against the slots in said valve housing.

5. The invention as claimed in claim 2 wherein said outer pinch bar connecting links are offset to provide clearance with respect to said inner pinch bar and drive shaft in said first position of said drive shaft.

6. The invention as claimed in claim 2 wherein said means for adjusting the lengths of a pair of said connecting links comprises means for adjusting the length of said outer pinch bar connecting links.

7. The invention as claimed in claim 2 wherein said means for rotating said drive shaft comprises a hand lever external of said valve housing connected to an extending end of said drive shaft.

8. The invention as claimed in claim 7 including means for selectively locking said hand lever in a predetermined position.

* * * * *